(12) United States Patent
Liu et al.

(10) Patent No.: US 8,736,240 B2
(45) Date of Patent: May 27, 2014

(54) HOLD-UP TIME EXTENSION CIRCUIT FOR A POWER CONVERTER

(75) Inventors: Gang Liu, Shanghai (CN); Liang He, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 260 days.

(21) Appl. No.: 13/269,696

(22) Filed: Oct. 10, 2011

(65) Prior Publication Data

US 2013/0027981 A1    Jan. 31, 2013

(30) Foreign Application Priority Data

Jul. 25, 2011   (CN) .......................... 2011 1 0208372

(51) Int. Cl.
*H02M 3/158*   (2006.01)

(52) U.S. Cl.
USPC ............................................ 323/266; 307/46

(58) Field of Classification Search
USPC ............. 323/266, 271; 307/44, 45, 46, 80, 82
See application file for complete search history.

(56) References Cited

U.S. PATENT DOCUMENTS

| 6,384,491 | B1 * | 5/2002 | O'Meara ........................ 307/86 |
| 6,650,552 | B2 * | 11/2003 | Takagi et al. .................. 363/17 |
| 7,355,303 | B2 * | 4/2008 | Swanson et al. ................ 307/66 |

* cited by examiner

*Primary Examiner* — Harry Behm
*Assistant Examiner* — Matthew Grubb
(74) *Attorney, Agent, or Firm* — Morris, Manning & Martin, LLP; Tim Tingkang Xia, Esq.

(57) ABSTRACT

A power system has a power converter adapted for converting a first input voltage at an input thereof to a first output voltage at an output thereof, and a hold-up time extension circuit comprising a step-up stage and a step-down stage coupled to each other via a first energy-storage capacitor, where an input of the step-up stage is coupled to the input of the power converter, an output of the step-up stage is coupled to an input of the step-down stage, and an output of the step-down stage is coupled to the input of the power converter. The step-up stage is adapted for converting the first input voltage of the power converter to a second output voltage, and the step-down stage is adapted for converting the second output voltage of the step-up stage to the input voltage of the power converter.

14 Claims, 7 Drawing Sheets

100

HOLD-UP TIME EXTENSION CIRCUIT FOR A POWER CONVERTER

CROSS-REFERENCE TO RELATED PATENT APPLICATION

This application claims priority to and the benefit of, pursuant to 35 U.S.C. §119(a), Chinese patent application No. 201110208372.X, filed Jul. 25, 2011, entitled "HOLD-UP TIME EXTENSION CIRCUIT FOR A POWER CONVERTER", by Gang Liu and Liang He, the content of which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference were individually incorporated by reference.

FIELD OF THE INVENTION

The present invention relates to a hold-up time extension circuit for a power system that needs to provide regulated output for some time after an input voltage drops out. More particularly, it relates to a hold-up time extension circuit that includes a step-up converter and a step-down converter coupled to each other via an energy-storage capacitor.

BACKGROUND OF THE INVENTION

Most computers and portable electronic devices require power supplies that are capable of maintaining an output voltage within a specified range for a certain amount of time, typically 15 to 25 milliseconds, after an input voltage drops out. This time, referred to as the hold-up time, is used to orderly terminate the operation of a data processing equipment or to switch over to UPS operation after a line failure. The required energy to maintain the output voltage during the hold-up time is delivered from a properly sized energy-storage capacitor coupled to the input of the power supply.

In order to maximize the power density of the power supply, the size of the energy-storage capacitor needs to be minimized. U.S. Pat. No. 6,504,497, the content of which is herein incorporated by reference in its entirety, discloses an approach to maximize the utilization of the stored energy by using a hold-up time extension circuit. However, further improvement in the hold-up time extension circuit is needed.

Therefore, a heretofore unaddressed need exists in the art to address the aforementioned deficiencies and inadequacies.

SUMMARY OF THE INVENTION

The present invention, in one aspect, relates to a power system. In one embodiment, the power system has a power converter adapted for converting a first input voltage at an input thereof to a first output voltage at an output thereof, and a hold-up time extension circuit comprising a step-up stage and a step-down stage coupled to each other via a first energy-storage capacitor, where an input of the step-up stage is coupled to the input of the power converter, an output of the step-up stage is coupled to an input of the step-down stage, and an output of the step-down stage is coupled to the input of the power converter.

The step-up stage is adapted for converting the first input voltage of the power converter to a second output voltage, and the step-down stage is adapted for converting the second output voltage of the step-up stage to the input voltage of the power converter, and wherein the step-up stage maintains the second output voltage across the first energy-storage capacitor, and the step-down stage is activated when the first input voltage of the power converter is lower than a predetermined value.

The power system may further include a second energy-storage capacitor coupled to the input of the power converter.

In one embodiment, the first input voltage of the power converter is a DC voltage, where the first input voltage of the power converter ranges from about 30 volts to about 100 volts.

In one embodiment, the second output voltage of the step-up stage is higher than the first input voltage of the power converter, where the second output voltage of the step-up stage ranges from about 150 volts to about 450 volts.

In one embodiment, the first energy-storage capacitor comprises one or more capacitors connected to each other in parallel.

In one embodiment, the step-up stage comprises a Flyback converter or a Boost converter. The step-down stage comprises a Buck converter.

In one embodiment, the power converter comprises a half-bridge circuit and a transformer. In another embodiment, the power converter comprises a full-bridge circuit and a transformer, where the full-bridge circuit comprises four transistors. In one embodiment, the four transistors of the full-bridge circuit are controlled by the first input voltage of the power converter to regulate the power converter. In another embodiment, the four transistors of the full-bridge circuit are controlled by both the first input voltage and the first output voltage of the power converter to regulate the power converter.

In another aspect of the present invention, a power system includes a power converter adapted for converting a first input voltage at an input thereof to a first output voltage at an output thereof, and a hold-up time extension circuit comprising a step-up stage and a step-down stage coupled to each other via a first energy-storage capacitor, an input of the step-up stage being coupled to the input of the power converter, an output of the step-up stage being coupled to an input of the step-down stage, an output of the step-down stage being coupled to the input of the power converter. The step-up stage is adapted for converting the first input voltage of the power converter to a second output voltage, and the step-down stage is adapted for converting the second output voltage of the step-up stage to the first input voltage of the power converter, and wherein the step-up stage maintains the second output voltage across the first energy-storage capacitor, and the step-down stage is activated when the first output voltage of the power converter is lower than a predetermined value.

The power system also has a second energy-storage capacitor coupled to the input of the power converter.

In one embodiment, the first input voltage of the power converter is a DC voltage.

In one embodiment, the second output voltage of the step-up stage is higher than the first input voltage of the power converter.

In one embodiment, the first energy-storage capacitor comprises one or more capacitors connected to each other in parallel.

In yet another aspect of the present invention, a power system includes a first step-down converter adapted for converting a first input voltage at an input thereof to a third output voltage at an output thereof, a power converter coupled to the first step-down converter via a second energy-storage capacitor and adapted for converting the third output voltage of the first step-down converter to a first output voltage, and a hold-up time extension circuit comprising a step-up converter and a second step-down converter coupled to each other via a first energy-storage capacitor, an input of the step-up converter being coupled to the input of the first step-down converter, an output of the step-up converter being coupled to an input of the second step-down converter, and an output of the second step-down converter being coupled to the input of the first step-down converter. The step-up converter is adapted for converting the first input voltage of the first step-down converter to a second output voltage, and the second step-down converter is adapted for converting the second output voltage of the step-up converter to the first input voltage of the first step-down converter, and wherein the step-up converter maintains the second output voltage across the first energy-storage capacitor, and the second step-down converter is activated when the first input voltage of the first step-down converter is lower than a predetermined value.

In one embodiment, the first input voltage of the first step-down converter is a DC voltage, wherein the third output voltage of the first step-down converter is lower than the first input voltage of the first step-down converter.

In one embodiment, the first step-down converter comprises a Buck converter.

In one embodiment, the second energy-storage capacitor comprises one or more capacitors connected to each other in parallel.

In one embodiment, the power system may further have a fourth energy-storage capacitor coupled to the input of the first step-down converter.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
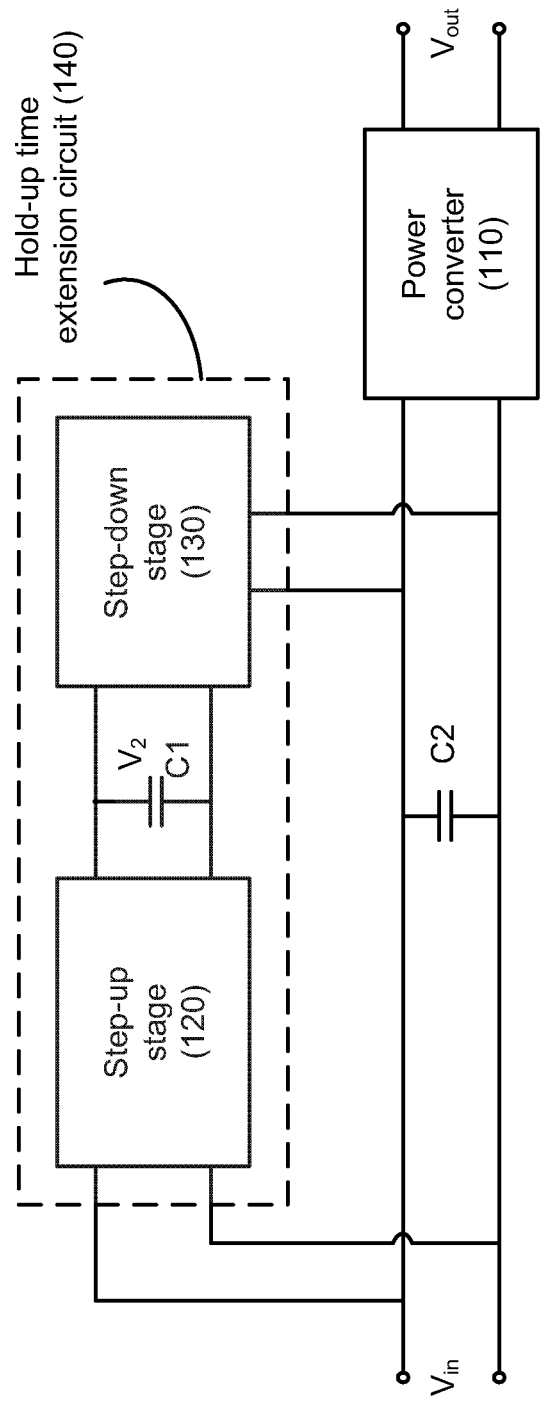
FIG. 1 shows a schematic diagram of a power system including a power converter and a hold-up time extension circuit according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1-7. In accordance with the purposes of this invention, as embodied and broadly described herein, this invention, in one aspect, relates to a power system.

FIG. 1 shows a schematic diagram of the power system 100 according to one embodiment of the present invention. The power system 100 includes a power converter 110 adapted for converting a first input voltage $V_{in}$ at an input thereof to a first output voltage $V_{out}$ at an output thereof. The first input voltage $V_{in}$ can be a DC voltage which may range, for example and without limitation, from about 30 volts to about 100 volts. And the power converter 110 can be a regulated converter or an un-regulated converter or a semi-regulated converter.

The power system 100 further includes a hold-up time extension circuit 140. The hold-up time extension circuit 140 includes a step-up stage 120 and a step-down stage 130 coupled to each other via a first energy-storage capacitor C1. An input of the step-up stage 120 is coupled to the input of the power converter 110. An output of the step-up stage 120 is coupled to an input of the step-down stage 130. An output of the step-down stage 130 is coupled to the input of the power converter. The step-up stage 120 is adapted for converting the first input voltage $V_{in}$ of the power converter to a second output voltage $V_2$. The second output voltage $V_2$ may range, for example and without limitation, from about 150 volts to about 450 volts. The step-down stage 130 is adapted for converting the second output voltage $V_2$ to the first input voltage $V_{in}$ of the power converter 110. The step-up stage 120 maintains the second output voltage $V_2$ across the first energy-storage capacitor C1. The first energy-storage capacitor C1 may be a single capacitor or a plurality of capacitors connected to each other in parallel. The step-down stage 130 is not activated during normal operating conditions and is activated when the first input voltage $V_{in}$ of the power converter 110 drops below a predetermined value. In addition, a second energy-storage capacitor C2 is coupled to the input of the power converter 110.

Figure 2:
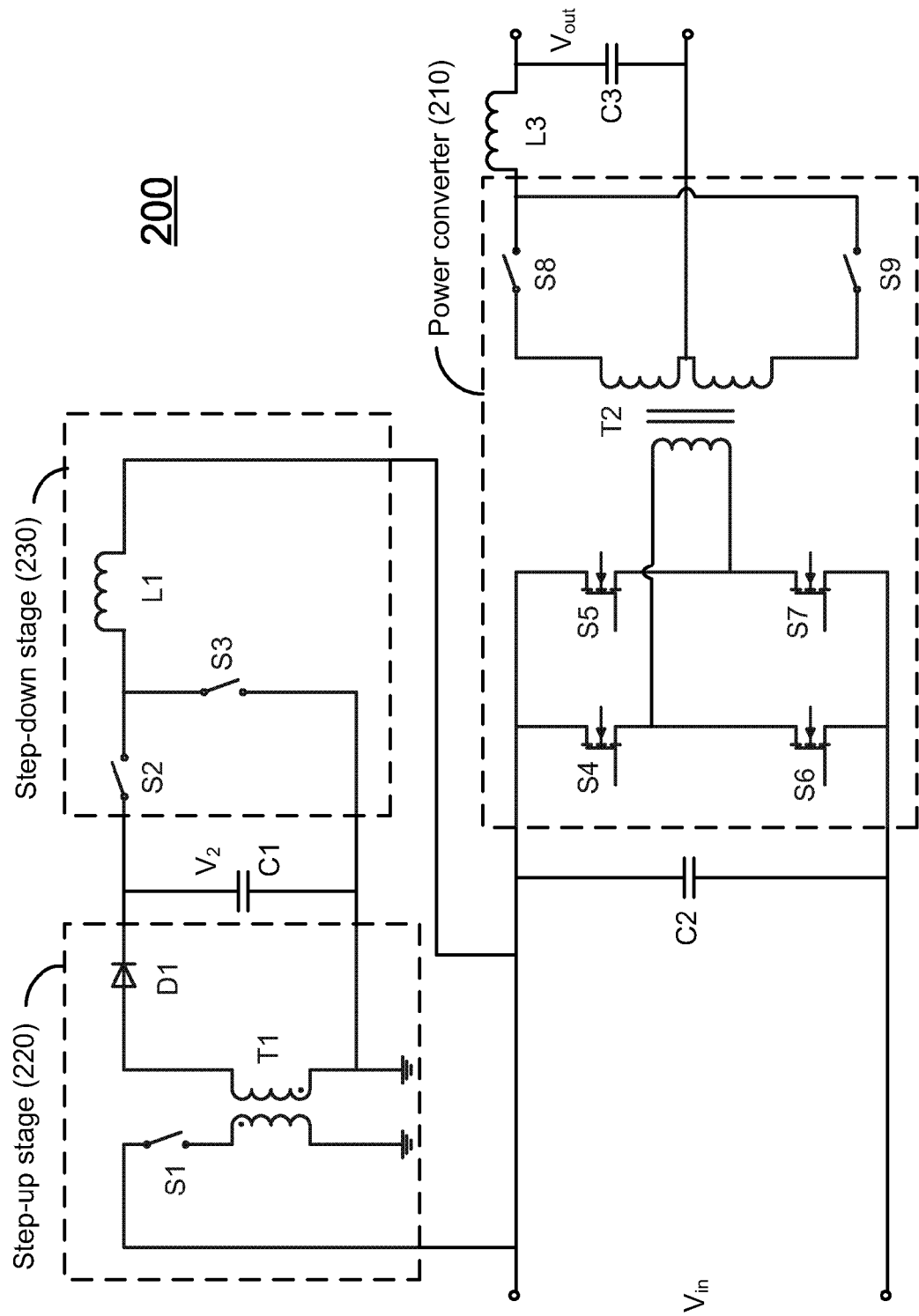
FIG. 2 shows a circuit diagram of a power system including a power converter and a hold-up time extension circuit according to one embodiment of the present invention.

FIG. 2 shows a circuit diagram of a power system 200 according to one embodiment of the present invention. The power system 200 includes a power converter 210 and a hold-up time extension circuit. The power converter 210 includes four transistors S4-S7, a transformer T2, and two switches S8 and S9. The four transistors S4-S7 form a full-bridge circuit. A filtering circuit including a capacitor C3 and an inductor L3 is coupled to the output of the power converter 210. In other embodiments, the power converter 210 may include a half-bridge circuit instead of a full-bridge circuit. The power converter 210 may be a pulse width modulated (PWM) converter, or a resonant converter for example a LLC converter. The hold-up time extension circuit includes a step-up stage 220 and a step-down stage 230 coupled to each other via a first energy-storage capacitor C1. The step-up stage 220 and the step-down stage 230 have a Flyback topology and a Buck topology, respectively. The Flyback step-up stage 220 includes a transformer T1, a switch S1 and a diode D1. The Flyback step-up stage 220 may be operated in a burst mode or a low frequency mode. The Buck step-down stage 230 includes an inductor L1, and two switches S2 and S3. The Flyback step-up stage 220 maintains a second output voltage $V_2$ across the first energy-storage capacitor C1. The Buck step-down stage 230 is activated when the first input voltage $V_{in}$ of the power converter 210 drops below a predetermined value. In addition, a second energy-storage capacitor C2 is coupled to the input of the power converter 210.

Figure 3:
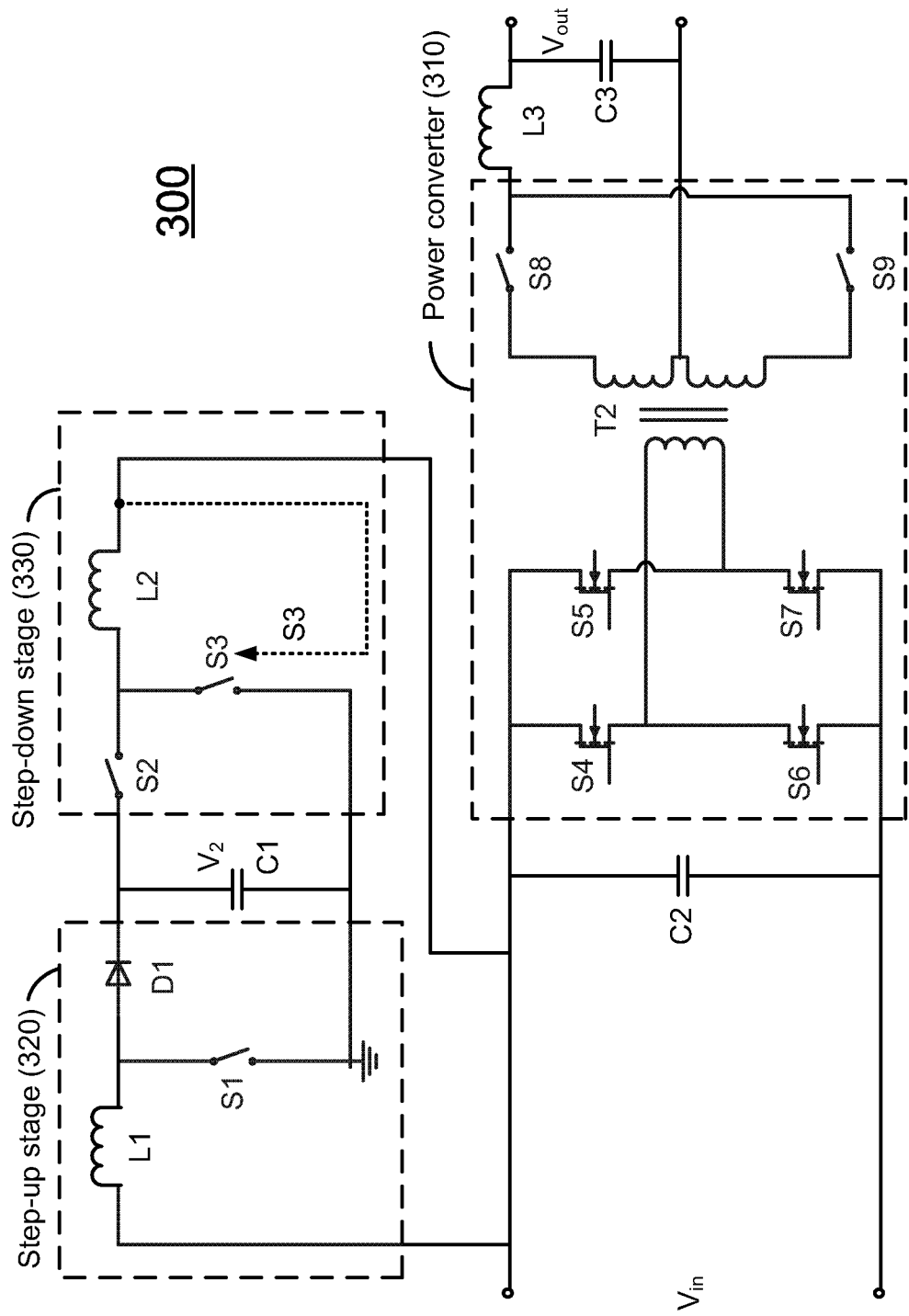
FIG. 3 shows a circuit diagram of a power system including a power converter and a hold-up time extension circuit according to another embodiment of the present invention.
Figure 4:
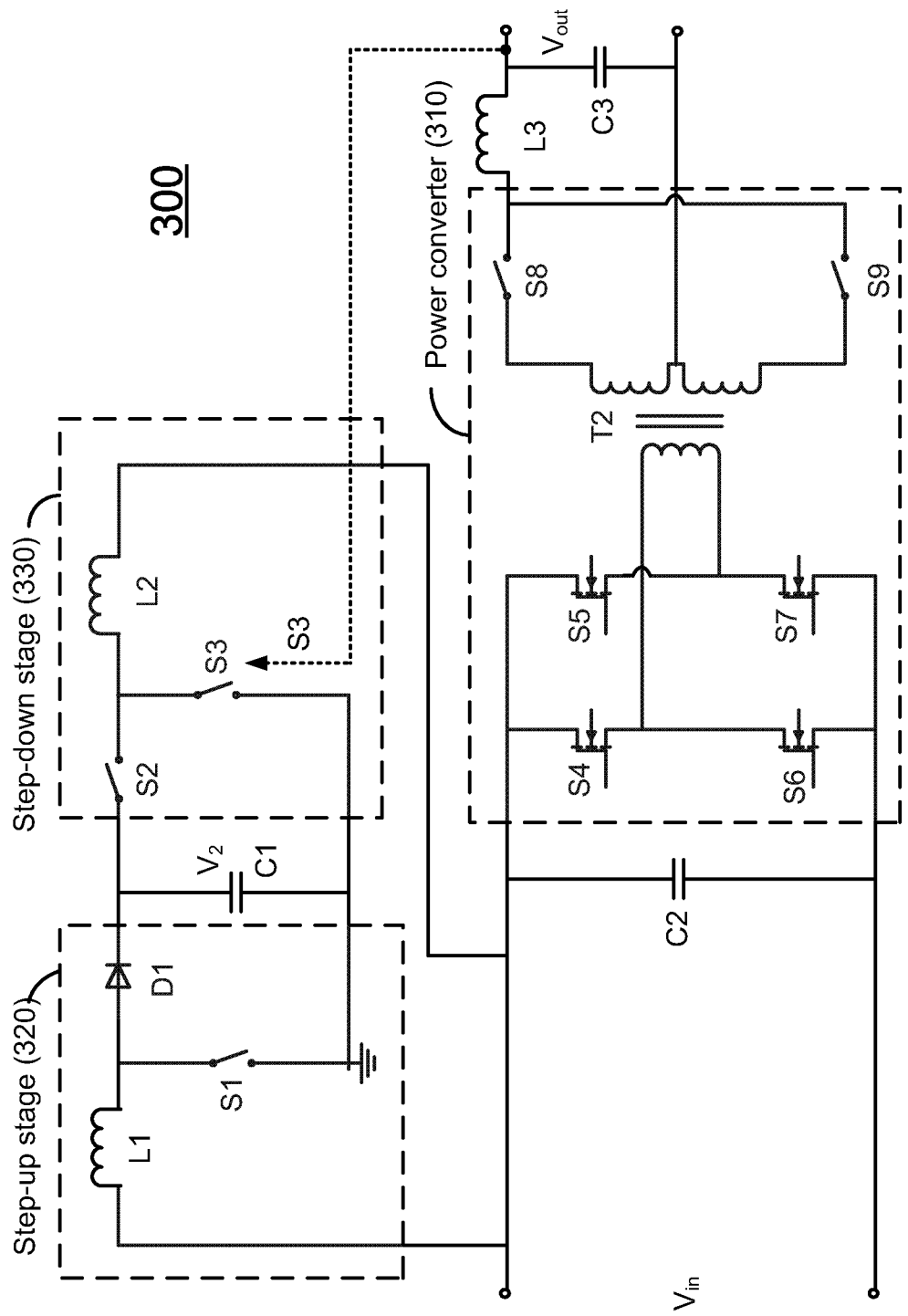
FIG. 4 shows a circuit diagram of a power system including a power converter and a hold-up time extension circuit according to yet another embodiment of the present invention.

FIG. 3 shows a circuit diagram of a power system 300 according to another embodiment of the present invention. The power system 300 includes a power converter 310 and a hold-up time extension circuit. The power converter 310 is similar to the power converter 210 in the power system 200 shown in FIG. 2. The hold-up time extension circuit includes a step-up stage 320 and a step-down stage 330 coupled to each other via a first energy-storage capacitor C1. The step-up stage 320 and the step-down stage 330 have a Boost topology and a Buck topology, respectively. The Boost step-up stage 320 includes an inductor L1, a switch S1, and a diode D1. The Buck step-down stage 330 includes an inductor L2, and two switches S2 and S3. The Boost step-up stage 320 maintains a second output voltage $V_2$ across the first energy-storage capacitor C1. In addition, a second energy-storage capacitor C2 is coupled to the input of the power converter 310.

In one embodiment, the switch S3 of the step-down stage 330 is controlled by the first input voltage $V_{in}$ of the power converter 310 as illustrated by the dashed arrow in FIG. 3, so that the step-down stage 330 is activated when the first input voltage $V_{in}$ drops below a predetermined value. In an alternative embodiment, the switch S3 of the step-down stage 330 is controlled by the first output voltage $V_{out}$ of the power converter 310 as illustrated by the dashed arrow in FIG. 4, so that the step-down stage 330 is activated when the first output voltage $V_{out}$ drops below a predetermined value.

Similarly, for the power system 200 shown in FIG. 2, the switch S3 of the step-down stage 230 may also be controlled by the first input voltage $V_{in}$ or the first output voltage $V_{out}$ of the power converter 210 so that the step-down stage 230 is activated when the first input voltage $V_{in}$ or the first output voltage $V_{out}$ drops below a predetermined value.

Figure 5:
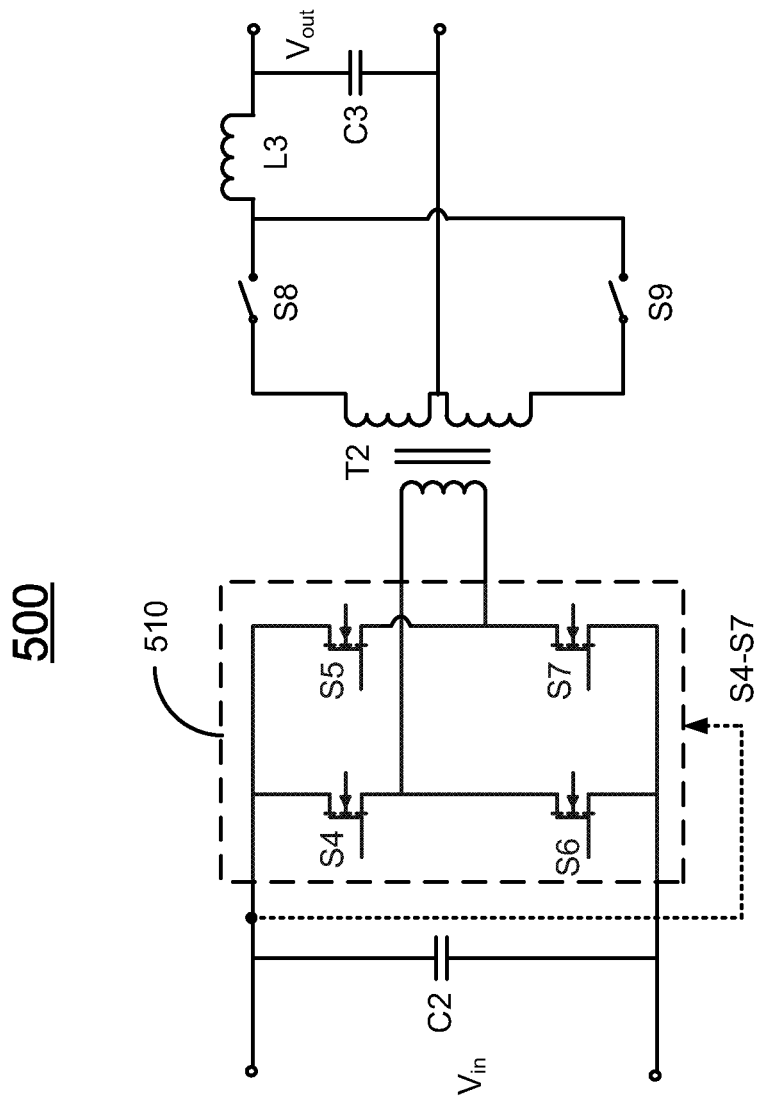
FIG. 5 shows a circuit diagram of a power converter according to one embodiment of the present invention.
Figure 6:
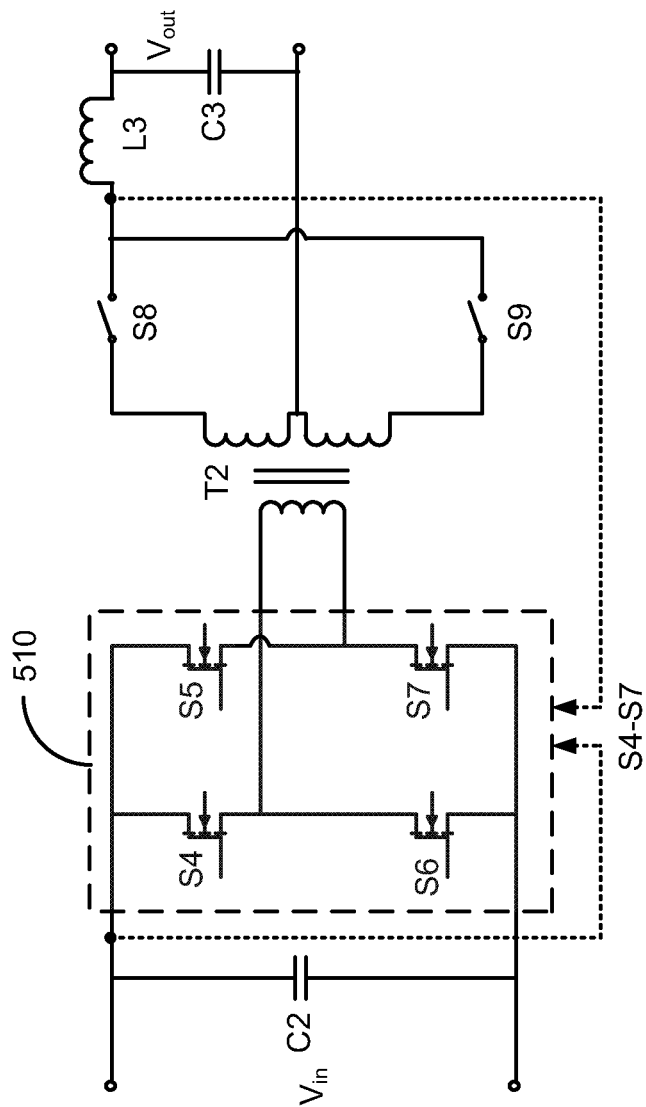
FIG. 6 shows a circuit diagram of a power converter according to another embodiment of the present invention.

FIG. 5 illustrates a method of regulating a power converter 500. The power converter 500 includes a full-bridge circuit 510, a transformer T2, and two switches S8 and S9. The full-bridge circuit 510 comprises four transistors S4-S7. In one embodiment, the four transistors S4-S7 are controlled by the input voltage $V_{in}$ of the power converter 500, as illustrated by the dashed arrow in FIG. 5. FIG. 6 illustrates another method of regulating the power converter 500. In this embodiment, the four transistors S4-S7 are controlled by both the input voltage $V_i$, and the output voltage $V_{out}$ of the power converter 500, as illustrated by the dashed arrows in FIG. 6.

Figure 7:
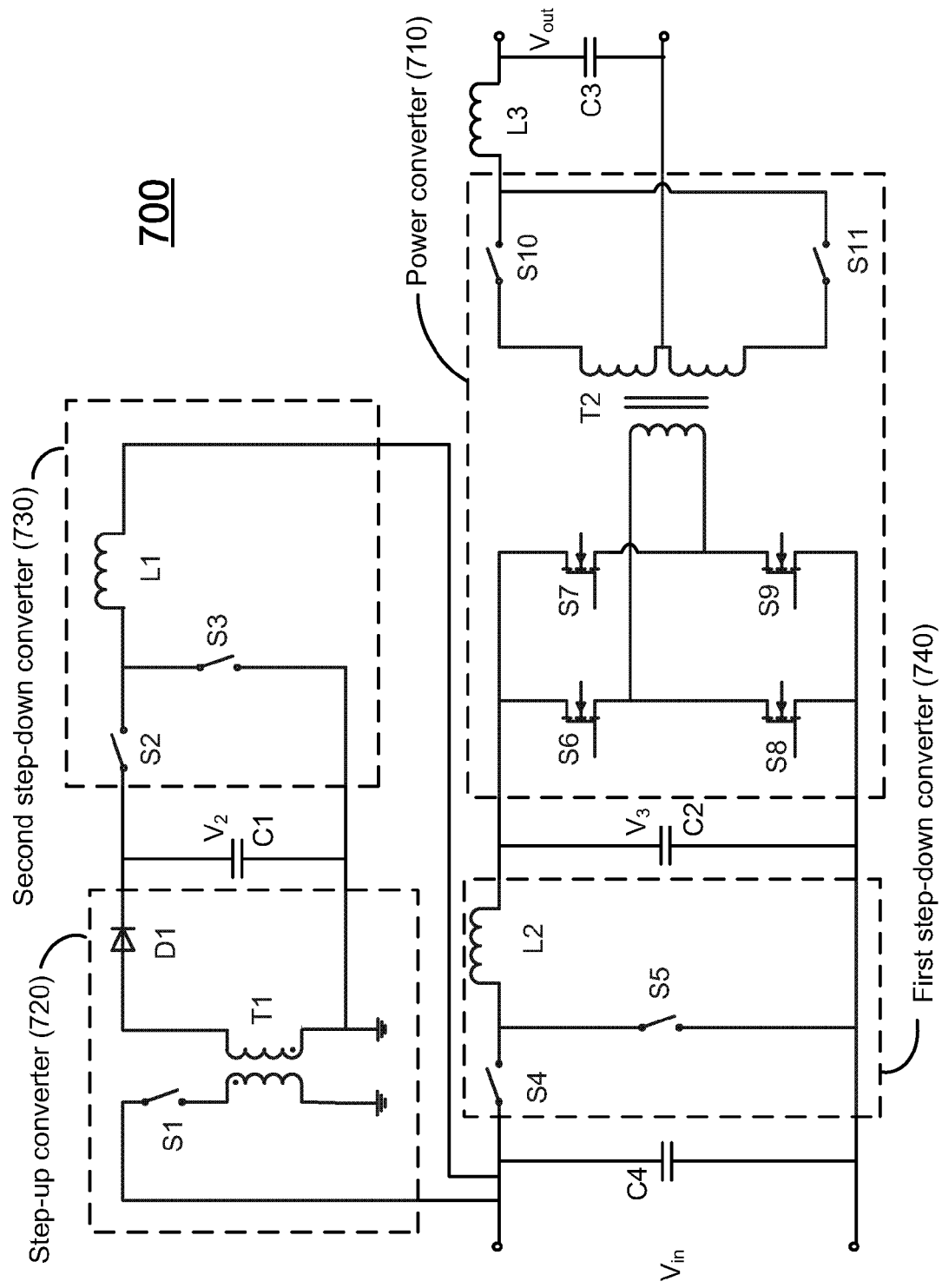
FIG. 7 shows a circuit diagram of a power system according to a further embodiment of the present invention.

FIG. 7 shows a circuit diagram of a power system 700 according to a further embodiment of the present invention. The power system 700 includes a first step-down converter 740, a power converter 710, and a hold-up time extension circuit. The first step-down converter 740 is adapted to convert an input voltage $V_{in}$ at an input thereof to a third output voltage $V_3$ at an output thereof. In one embodiment, the third output voltage $V_3$ is lower than the first input voltage $V_{in}$. The first step-down converter 740 has a Buck topology and includes an inductor L2 and two switches S4 and S5. The output of the first step-down converter 740 is coupled to an input of the power converter 710 via a second energy-storage capacitor C2. The power converter 710 is adapted to convert the third output voltage $V_3$ of the first step-down converter 740 to a first output voltage $V_{out}$ at an output thereof. The power converter 710 is similar to the power converter 210 in the power system 200 shown in FIG. 2. The hold-up time extension circuit includes a step-up converter 720 and a second step-down converter 730 coupled to each other via a first energy-storage capacitor C1. The step-up converter 720 is adapted for converting the first input voltage $V_{in}$ of the first step-down converter 740 to a second output voltage $V_2$. The second step-down converter 730 is adapted for converting the second output voltage $V_2$ of the step-up converter to the first input voltage of the first step-down converter 740. The step-up converter 720 maintains the second output voltage $V_2$ across the first energy-storage capacitor C1. The second step-down converter 730 is activated when the first input voltage $V_{in}$, of the first step-down converter 740 drops below a predetermined value. In addition, a fourth energy-storage capacitor C4 is coupled to the input of the first step-down converter 740.

In sum, the present invention, among other things, recites a power system having a hold-up time extension circuit for providing regulated output for some time after an input voltage drops out. The hold-up time extension circuit includes a step-up converter and a step-down converter coupled to each other via an energy-storage capacitor.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A power system, comprising:
   (a) a power converter adapted for converting a first input voltage at an input thereof to a first output voltage at an output thereof; and
   (b) a hold-up time extension circuit comprising a step-up stage and a step-down stage coupled to each other via a first energy-storage capacitor, an input of the step-up stage being coupled to the input of the power converter, an output of the step-up stage being coupled to an input of the step-down stage, an output of the step-down stage being coupled to the input of the power converter;
   wherein the step-up stage is adapted for converting the first input voltage of the power converter to a second output voltage, and the step-down stage is adapted for converting the second output voltage of the step-up stage to the first input voltage of the power converter, and wherein the step-up stage maintains the second output voltage across the first energy-storage capacitor, and the step-down stage is activated when the first output voltage of the power converter is lower than a predetermined value.

2. The power system of claim 1, further comprising a second energy-storage capacitor coupled to the input of the power converter.

3. The power system of claim 1, wherein the first input voltage of the power converter is a DC voltage.

4. The power system of claim 1, wherein the second output voltage of the step-up stage is higher than the first input voltage of the power converter.

5. The power system of claim 1, wherein the first energy-storage capacitor comprises one or more capacitors connected to each other in parallel.

6. The power system of claim 1, wherein the first input voltage of the power converter ranges from about 30 volts to about 100 volts.

7. The power system of claim 1, wherein the second output voltage of the step-up stage ranges from about 150 volts to about 450 volts.

8. The power system of claim 1, wherein the step-up stage comprises a Flyback converter or a Boost converter.

9. The power system of claim 1, wherein the step-down stage comprises a Buck converter.

10. The power system of claim 1, wherein the power converter comprises a half-bridge circuit and a transformer.

11. The power system of claim 1, wherein the power converter comprises a full-bridge circuit and a transformer.

12. The power system of claim 11, wherein the full-bridge circuit comprises four transistors.

13. The power system of claim 12, wherein the four transistors of the full-bridge circuit are controlled by the first input voltage of the power converter.

14. The power system of claim 12, wherein the four transistors of the full-bridge circuit are controlled by both the first input voltage and the first output voltage of the power converter.

* * * * *